United States Patent
Lucey

(10) Patent No.: US 9,424,463 B2
(45) Date of Patent: Aug. 23, 2016

(54) SYSTEM AND METHOD FOR EYE ALIGNMENT IN VIDEO

(71) Applicant: COMMONWEALTH SCIENTIFIC AND INDUSTRIAL RESEARCH ORGANISATION, Campbell (AU)

(72) Inventor: Simon Lucey, Campbell (AU)

(73) Assignee: Commonwealth Scientific and Industrial Research Organisation (AU)

(*) Notice: Subject to any disclaimer, the term of this patent is extended or adjusted under 35 U.S.C. 154(b) by 0 days.

(21) Appl. No.: 14/685,653

(22) Filed: Apr. 14, 2015

(65) Prior Publication Data
US 2015/0220773 A1 Aug. 6, 2015

Related U.S. Application Data

(63) Continuation of application No. 13/868,650, filed on Apr. 23, 2013, now abandoned.

(51) Int. Cl.
| | |
|---|---|
| H04N 7/14 | (2006.01) |
| G06K 9/00 | (2006.01) |
| H04N 7/15 | (2006.01) |
| G06T 19/20 | (2011.01) |

(52) U.S. Cl.
CPC ........... *G06K 9/00221* (2013.01); *G06T 19/20* (2013.01); *H04N 7/144* (2013.01); *H04N 7/15* (2013.01); *G06T 2219/2016* (2013.01)

(58) Field of Classification Search
CPC ........................................................ H04N 7/14
USPC .................................. 348/14.01, 14.12, 14.16
See application file for complete search history.

(56) References Cited

U.S. PATENT DOCUMENTS

| | | | | |
|---|---|---|---|---|
| 7,532,230 | B2 * | 5/2009 | Culbertson | G06F 3/013 345/474 |
| 8,144,976 | B1 * | 3/2012 | Shiell | G06K 9/00281 345/420 |
| 8,421,805 | B2 * | 4/2013 | Bishop | G06T 13/40 345/473 |
| 2004/0227693 | A1 | 11/2004 | Rambo et al. | |
| 2008/0278516 | A1 * | 11/2008 | Santon | H04N 7/144 345/619 |
| 2011/0102553 | A1 * | 5/2011 | Corcoran | G06K 9/00281 348/50 |
| 2012/0219180 | A1 * | 8/2012 | Mehra | G06F 3/013 382/103 |
| 2014/0267584 | A1 * | 9/2014 | Atzpadin | H04N 7/144 348/14.16 |

* cited by examiner

*Primary Examiner* — Olisa Anwah
(74) *Attorney, Agent, or Firm* — Dureska & Moore, LLC; David P. Dureska; Greg Strugalski

(57) ABSTRACT

A system for image manipulation enables an improved video conferencing experience. The system includes a camera; a display screen adjacent to the camera; a processor coupled to the camera and the display screen; and a memory coupled to the processor. Instructions executable by the processor enable receiving a source image from the camera and generating a synthetic image based upon the source image. The synthetic image corresponds to a view of a virtual camera located at the display screen.

14 Claims, 8 Drawing Sheets

SYSTEM AND METHOD FOR EYE ALIGNMENT IN VIDEO

CROSS-REFERENCE TO RELATED APPLICATION

This application is a continuation of U.S. patent application Ser. No. 13/868,650 filed Apr. 23, 2013, which claims the benefit of Australian Patent Application with Priority No. 2012901830, filed May 4, 2012, both of which are hereby incorporated by reference in their entirety.

BACKGROUND OF THE INVENTION

1. Field of the Invention

The present invention relates to image manipulation. In particular, although not exclusively, the invention relates to eye alignment in video.

2. Background Art

Non-verbal social cues play a crucial role in communication. The eyes in particular are important for communication and provide an indication to others where attention is focused. In some cultures, it is respectful not to look a dominant person in the eye, and in western culture a person can be judged badly if they do not make direct eye contact.

Non-verbal cues are often, however, distorted on video conferencing systems of the prior art, leading to misunderstandings or miscommunications.

In their simplest form, video conferencing systems include a pair of cameras and a pair of display screens. Each of the pair of cameras and display screens is directed at one of the users. The cameras are placed either beside or above the display screens in order to not block the screens, and modern laptops with video conferencing facilities often include an integrated camera that is permanently positioned above the display screen.

A disadvantage of such systems is that eye cues are distorted, as the user looks at an image of the other user on the display screen while being recorded from a second position. Accordingly, the users do not appear to be making direct eye contact. Alternatively, a user may appear to be making eye contact when not actually doing so.

Specialised hardware systems have been developed which reduce this problem, as illustrated by video conferencing system 100 of FIG. 1. The system 100 includes a display screen 105 and a camera 110. A beam splitter 115 is located between the user 120 and the camera 110, and is configured to reflect an image from the display screen 105 while allowing light from the user 120 to be received by the camera.

A disadvantage of systems such as the system 100 is that they are costly, fragile, and bulky and thus cannot be integrated into thin laptop screens, and do not work well when a focus of the user 120 is on a non-central part of the display screen 105.

Other similar forms of video conferencing systems include semi-transparent screens, wherein a camera is located behind the semi-transparent screen, and have similar disadvantages.

SUMMARY OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

According to one aspect, the invention resides in a system for image manipulation, including:
   a camera;
   a display screen adjacent to the camera;
   a processor coupled to the camera and the display screen; and
   a memory coupled to the processor, including instructions executable by the processor for:
      receiving a source image from the camera; and
      generating a synthetic image based upon the source image, the synthetic image corresponding to a view of a virtual camera located at the display screen.

Preferably, the camera and display screen are integrated into a single structure. Alternatively, camera and display are independently movable, and the memory further includes instructions for estimating a location of the display screen relative to the camera.

Preferably, generating a synthetic image further includes:
   detecting a face in the source image; and
   transforming the face according to the virtual camera location.

Preferably, transforming the face includes applying an Active Appearance Model (AAM) to the face, and modifying parameters of the AAM.

Preferably, generating a synthetic image further includes:
   generating a 3D model of the face; and
   rotating the 3D model according to a displacement between the camera and the virtual camera.

Preferably, the virtual camera location is fixed centrally with respect to the display screen. Alternatively, the virtual camera location is determined based upon content presented on the display screen.

Preferably, the image comprises an image of a video sequence. The video sequence can be a two-dimensional or three-dimensional video sequence.

Preferably, the memory further includes instructions for:
   receiving a second source image from the camera; and
   generating a second synthetic image based upon the source image and the second source image, the second synthetic image corresponding to the view of the virtual camera.

According to certain embodiments, generating the synthetic image comprises modifying metadata relating to the source image. Preferably, the metadata includes camera parameters.

According to a second aspect, the invention resides in a computer implemented method for video conferencing including:
   receiving, on a data interface, a source image from a camera; and
   generating, by a processor, a synthetic image based upon the source image, the synthetic image corresponding to a view of a virtual camera located at a display screen adjacent to the camera.

According to certain embodiments, the method further includes estimating, by the processor, a location of the display screen relative to the camera.

Preferably, generating a synthetic image further includes:
   detecting a face in the source image; and
   transforming the face according to the virtual camera location.

Preferably, transforming the face includes applying an Active Appearance Model (AAM) to the face, and modifying parameters of the AAM.

Alternatively, transforming the face includes transferring facial expressions from the face to an avatar image.

Preferably, generating the synthetic image further includes:

generating a 3D model of the face; and rotating the 3D model according to a displacement between the camera and the virtual camera.

According to certain embodiments, the virtual camera location is determined, by the processor, based upon content presented on the display screen. Alternatively, the virtual camera location is predetermined.

Preferably, the image comprises an image of a video sequence. The video sequence can be a two-dimensional or three-dimensional video sequence.

Preferably, the method further includes:

receiving, on a data interface, a first remote image from a first remote device;

displaying, on the display screen, the first remote image; and sending, on the data interface, the synthetic image to the first remote device.

Preferably, the method further includes:

receiving, on the data interface, a second remote image from a second remote device; and displaying, on the display screen, the second remote image adjacent to the first remote image.

Preferably, the method further includes sending, on the data interface, the synthetic image to the second remote device. Alternatively, the method further includes:

generating, by the processor, a second synthetic image based upon the source image, the second synthetic image corresponding to a view of a second virtual camera located at the display screen; and sending, on the data interface, the second synthetic image to the second remote device.

Preferably, the method further includes:

receiving a further source image from the camera; and generating a further synthetic image based upon the source image and the further source image, the further synthetic image corresponding to the virtual camera view located at the display screen.

According to certain embodiments, generating the synthetic image comprises modifying metadata relating to the source image. Preferably, the metadata includes camera parameters.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
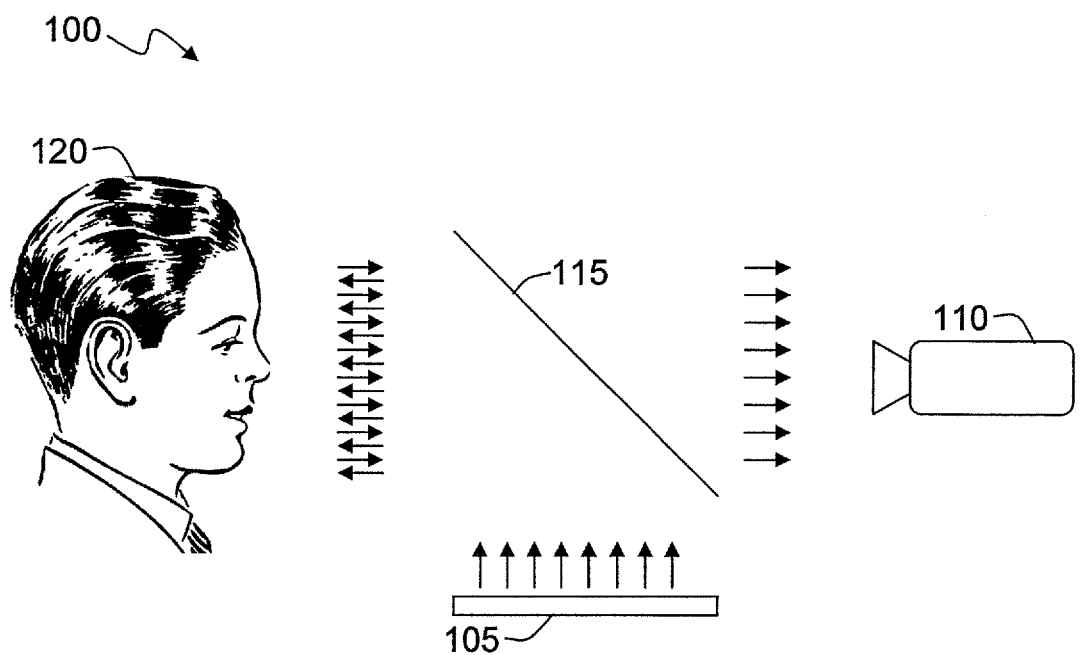
FIG. 1 illustrates a video conferencing system of the prior art.

Embodiments of the present invention comprise eye alignment systems and methods. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in a system for image manipulation, including: a camera; a display screen adjacent the camera; a processor coupled to the camera and the display screen; and a memory coupled to the processor, including instructions executable by the processor for: receiving a source image from the camera; and generating a synthetic image based upon the source image, the synthetic image corresponding to a virtual camera view located at the display screen.

Advantages of certain embodiments of the present invention include an improved video conferencing experience, an improved video or image based communication, and simpler and less expensive video capture or conferencing systems. Additionally, the present invention can be applied to legacy video conferencing systems.

Figure 2:
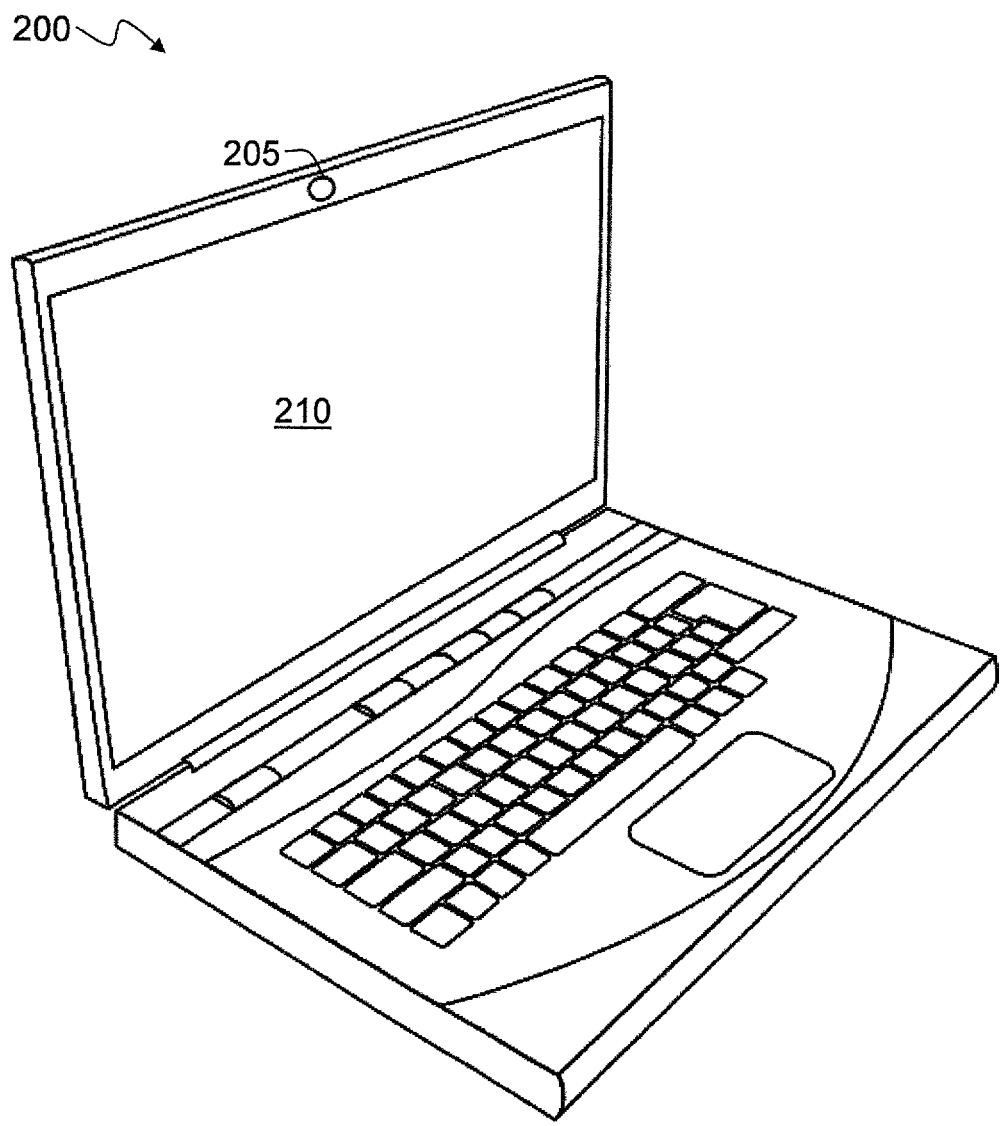
FIG. 2 illustrates a system for video manipulation, according to an embodiment of the present invention.
Figure 3:
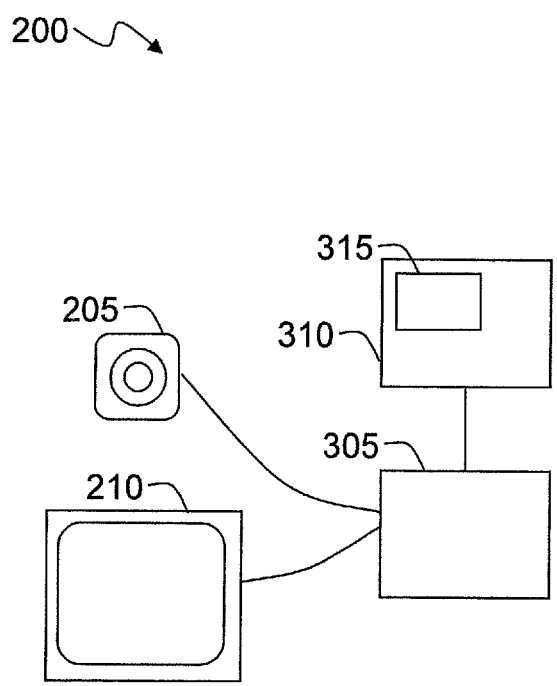
FIG. 3 illustrates a block diagram of the system of FIG. 2.

FIG. 2 illustrates a system 200 for video manipulation, according to an embodiment of the present invention, and FIG. 3 illustrates a block diagram of the system 200.

The system 200 includes a camera 205 and a display screen 210. The display screen 210 displays an image, and the camera 205 captures a video. The system 200 can, for example, be used for video conferencing, wherein a first user is recorded using the camera 205 and a second user is displayed using the display screen 210. The system 200 can, alternatively, be used for news-desk style recording, where a user reads a script displayed on the display screen 210 while being recorded using the camera 205.

The system 200 further includes a processor 305 that is coupled to the camera 205 and the display screen 210. The processor 305 is further coupled to a memory 310 including instruction code 315 for manipulating video recorded by the camera 205.

The instruction code 315 includes instructions for receiving source images from the camera 205, and instructions for generating a synthetic image based upon the source images. The source images and synthetic images form video sequences.

Figure 4:
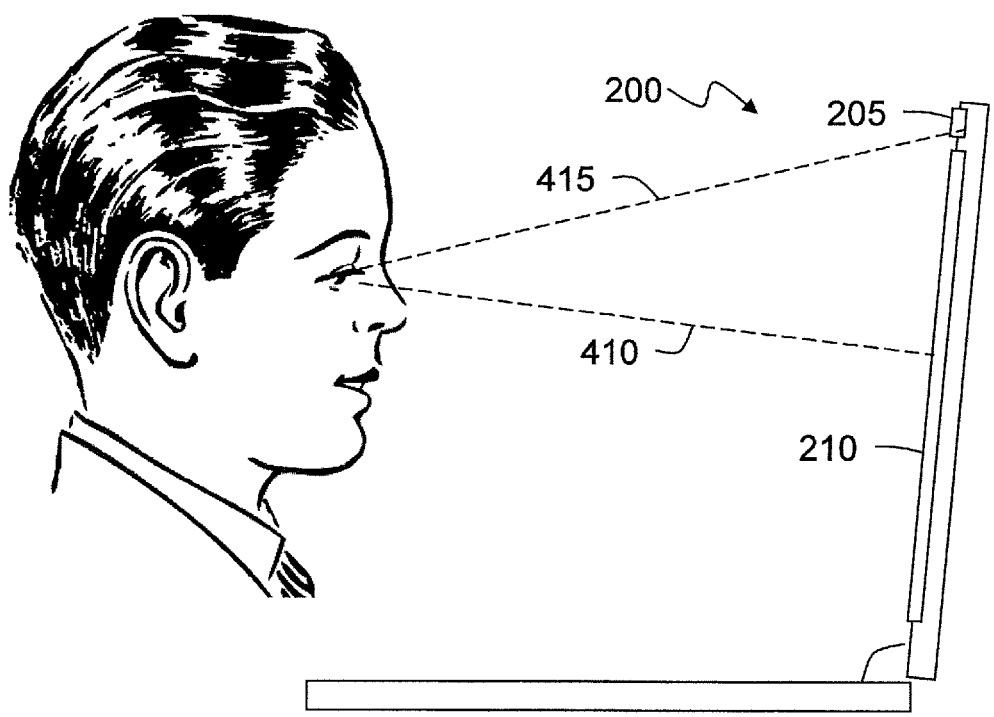
FIG. 4 further illustrates the system of FIG. 2.

As illustrated in FIG. 4, the camera 205 is located above the display screen 210. When a user looks directly at the display screen 210, as shown by light path 410, the source images captured by the camera 205, shown by light path 415, give an appearance that the user is looking down due to the location difference between the camera 205 and the display screen 210.

The synthetic image corresponds to a virtual camera that is located at the display screen 210. The virtual camera position may be centred on the display screen 210, or at a specific part of the display screen 210, such as an application window location, or other region of interest.

Figure 5:
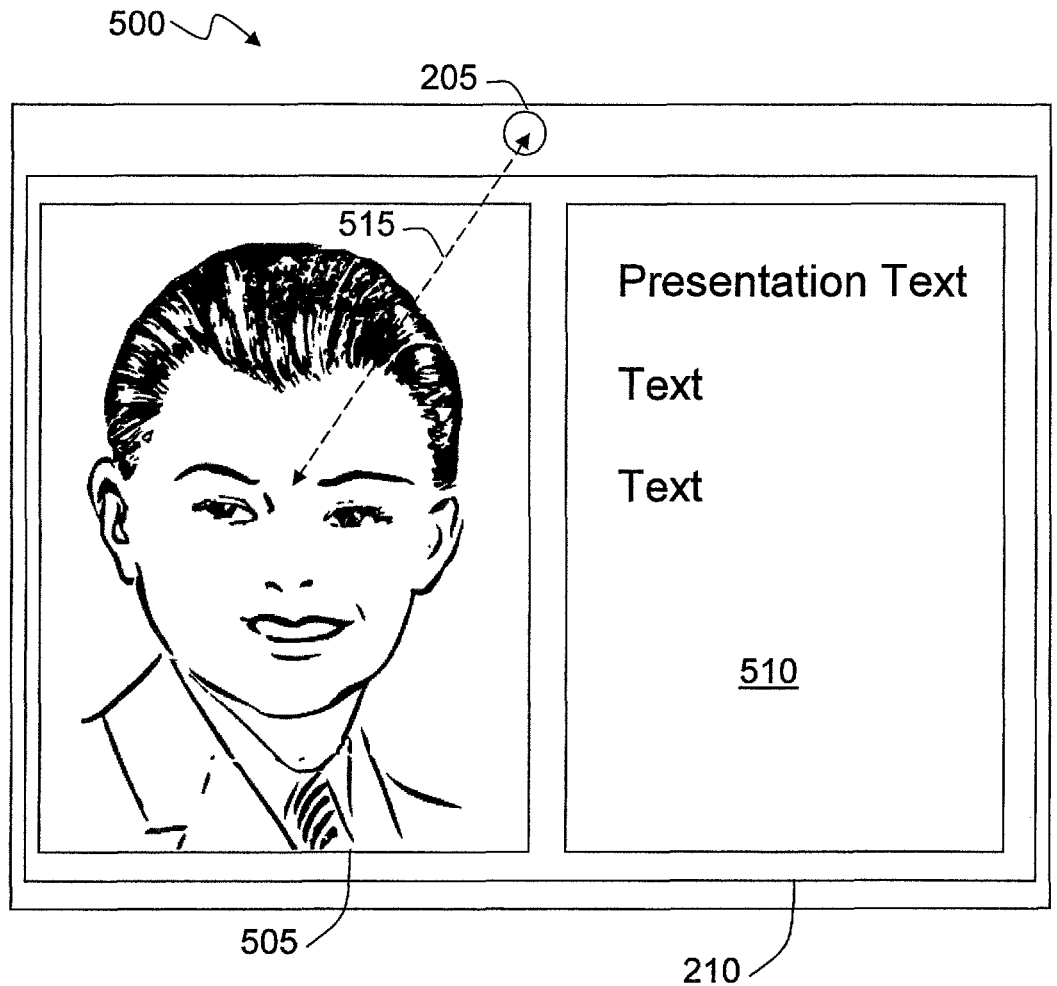
FIG. 5 illustrates a system for video manipulation, according to an alternative embodiment of the present invention.

FIG. 5 illustrates a system 500 where the virtual camera position is not centred relative to the display screen. The system 500 includes a video conferencing window 505 and a presentation sharing window 510. The system 500 enables a digital presentation to be viewed together with a video of the presenter.

In this case, the camera 205 and the virtual camera are offset in both vertical and horizontal directions as illustrated by virtual camera offset 515.

According to certain embodiments, an offset between the camera 205 and the display screen 210, and the offset between the virtual camera and the camera 205, is known. This can be the case for purpose built devices or laptops where the camera and display screen are moulded into a single shell or frame.

The virtual camera position can then be predetermined according to this relationship.

According to alternative embodiments (not shown), the offset between the camera 205 and the display screen 210 is variable. This is the case, for example, in a Personal Computer (PC) setup where the camera 205 comprises a web camera which is connected to the PC via a flexible cable. In this case, the instruction code 315 can include instructions for estimating a location of the display screen relative to the camera. Alternatively, the instruction code 315 can include instructions for receiving a camera location from the user or another source.

The synthetic image is then generated according to the camera 205 virtual camera offset. The synthetic image can be generated according to view synthesis methods of the prior art, such as geometrical view synthesis, using the locations of the camera 205 and the virtual camera, together with associated algorithms such as occlusion handling algorithms.

Alternatively, the view synthesis may be human face specific. In this case, a face is detected in the source image, to which a model is applied. The face is then transformed according to the camera 205 virtual camera offset.

A 3D model of the face can be generated, and rotated according to the virtual camera offset of the camera 205. The model can be an Active Appearance Model (AAM), wherein parameters of the AAM are modified according to the virtual camera offset of the camera 205. Image data is then rendered onto the transformed AAM.

According to an alternative embodiment, the view synthesis can be avatar based. The user's facial expressions can be transferred to an avatar image, the avatar image already rotated according to the virtual camera offset of the camera 205.

The avatar can be an avatar corresponding to a facial image of a user, or any other type of avatar. A model of the user and/or avatar can be generated according to an image of the user as discussed in PCT/AU2012/000295.

According to certain embodiments, the transform is only applied when the user is less than a predefined distance from the camera 205. When the user is far from the camera 205, the angle between the camera 205 and the virtual camera is reduced.

As discussed earlier, the method in its simplest form applies to a single image. According to certain embodiments, however, the method can be applied to several images together, as discussed further below.

The images can comprise a video sequence which can be a two-dimensional or three-dimensional video sequence. In the case of three-dimensional video, all images from a single time instance, i.e. views, are processed together. Accordingly, a transform can be chosen that both moves the image towards the virtual camera and retains the three dimensional data. In the case of multi-view three dimensional video, it may be possible to choose an existing view that more closely corresponds to the display screen 210 than the central view.

In the case of three-dimensional video, generating the synthetic image may comprise modifying camera parameters of the source image.

In the case of two-dimensional video, previous images may be used together with the source image to generate the synthetic image. Previous images can supply data relating to occluded areas of the synthetic image, or be used to improve the quality of the synthetic image.

Figure 6:
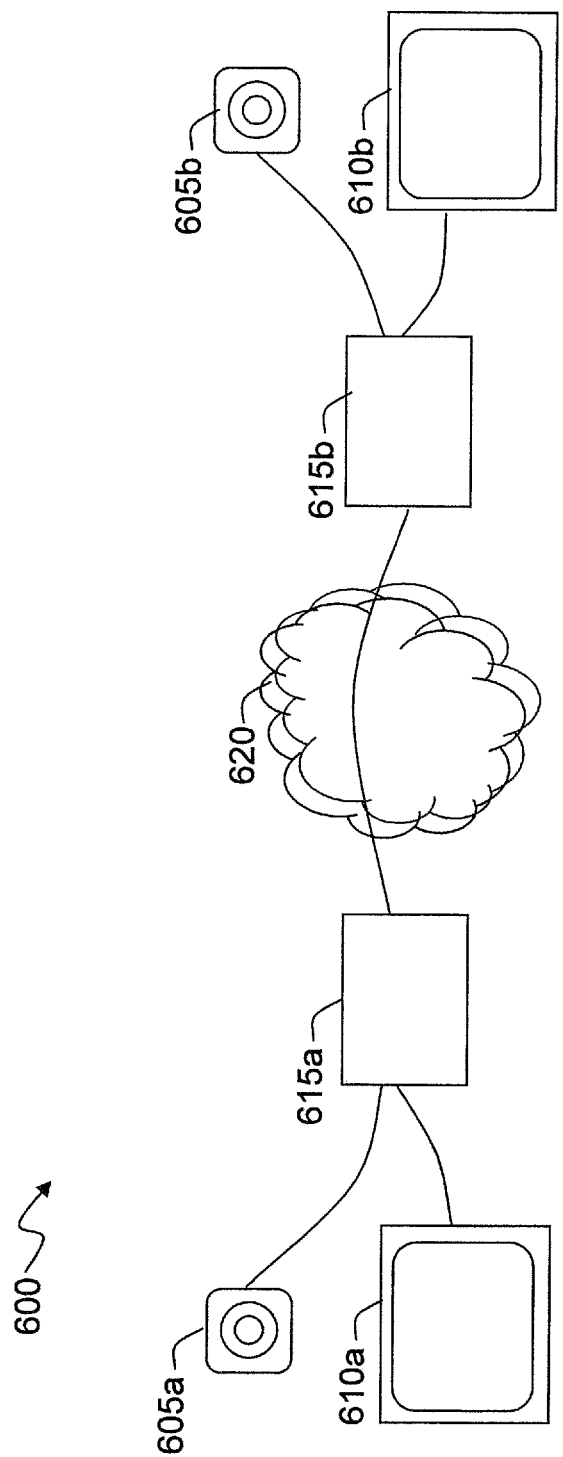
FIG. 6 illustrates a video conferencing system, according to an embodiment of the present invention.

FIG. 6 illustrates a video conferencing system 600, according to an embodiment of the present invention.

The video conferencing system 600 includes a first camera 605a and a first display screen 610a coupled to a first computing device 615a, which together form a first part of the video conferencing system at a first location. The video conferencing system 600 further includes a second camera 605b and a second display screen 610b coupled to a second computing device 615b, which together form a second part of the video conferencing system 600 at a second location.

The first and second computing devices are coupled via a communications network 620, such as the Internet.

A sequence of images are captured by the first and second cameras 605a, 605b, and transformed, by the first and second computing devices 615a, 615b, according to a distance between the first camera 605a and the first display screen 610a, and the second camera 605a and the second display screen 610b, respectively. The transformed images are then transmitted by computing devices 615a, 615b for display on display screens 610b, 610a. The images can be compressed prior to transmission, as will be readily understood by a person skilled in the art.

By transforming the images captured by both cameras 605a, 605b, it is possible for users in different locations to look each other in the eye through their respective display screen 610a, 610b, while the cameras 605a, 605b are located away from the display screens 610a, 610b.

According to certain embodiments (not shown), the video conferencing system 600 further includes multi-party video conferencing including at least a third computing device at a third location. Each display screen 610a, 610b displays images of other users of the video conferencing system 600, adjacent to each other.

The first computing device 605a can transmit the transformed images to both the second computing device 605b and the third computing device. Alternatively, the first computing device can send the transformed images to the second computing device 605b, and generate and send a second group of transformed images to the third computing device. The second group of synthetic images can then correspond to a second virtual camera view located at the display screen.

In this regard, the present invention enables video conferencing among several participants, each participant receiving video specifically configured for him or her.

Figure 7:
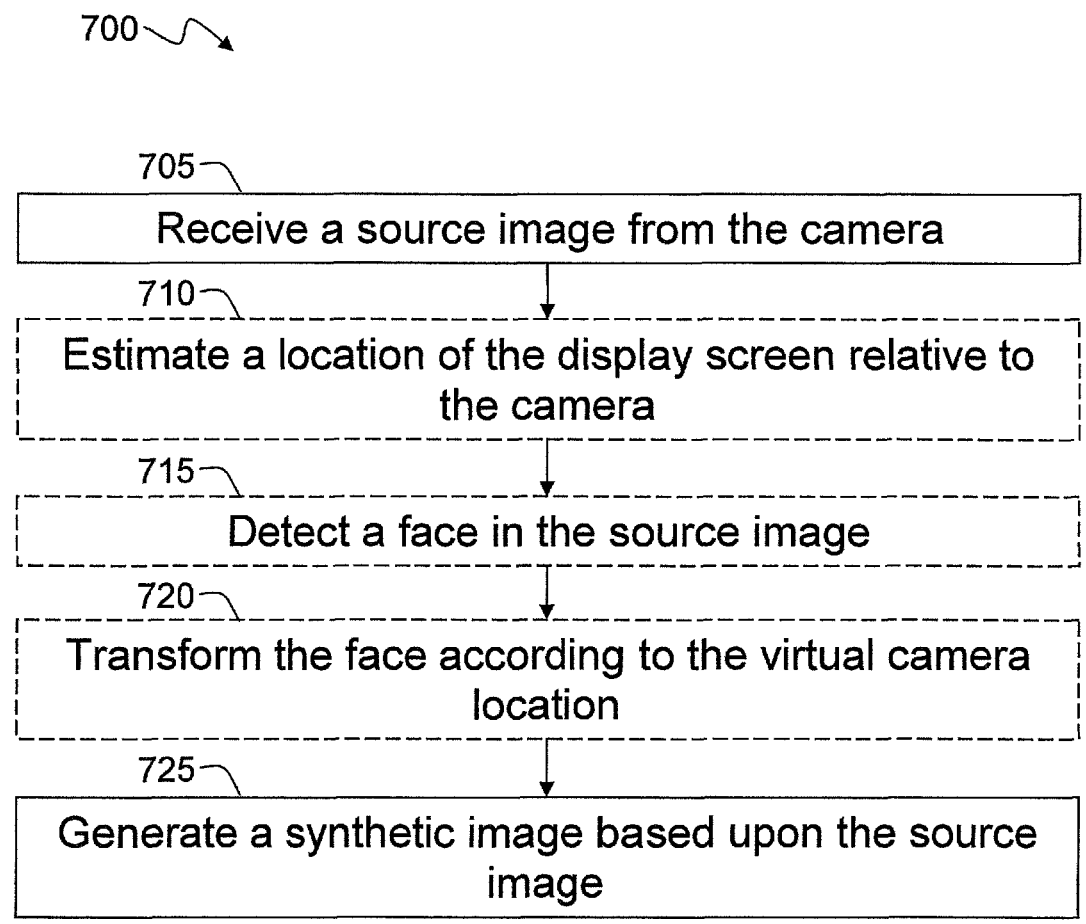
FIG. 7 illustrates a method of video manipulation, according to an embodiment of the present invention.

FIG. 7 illustrates a method of video manipulation, according to an embodiment of the present invention.

In 705, a source image is received, on a data interface, from a camera. The source image can comprise an image of a video sequence.

In 710, a location of a display screen relative to the camera is estimated. As will be readily understood by a person skilled in the art, this step is optional as the screen and display camera may be permanently mounted in a single device or frame, where the relative locations of the camera and display screen are already known. A virtual camera location is determined at the display screen.

In 715, a face is detected in the source image.

In 720, the face is transformed according to the virtual camera location. This can include applying a three-dimensional model to the face, and rotating the three-dimensional model.

In 725, a synthetic image is generated based upon the source image and a displacement between the camera and the virtual camera.

As will be readily understood by a person skilled in the art, steps 715 and 720 are optional. The entire source image can be transformed using geometrical view synthesis where the face is transformed in the same manner as other parts of the image.

Figure 8:
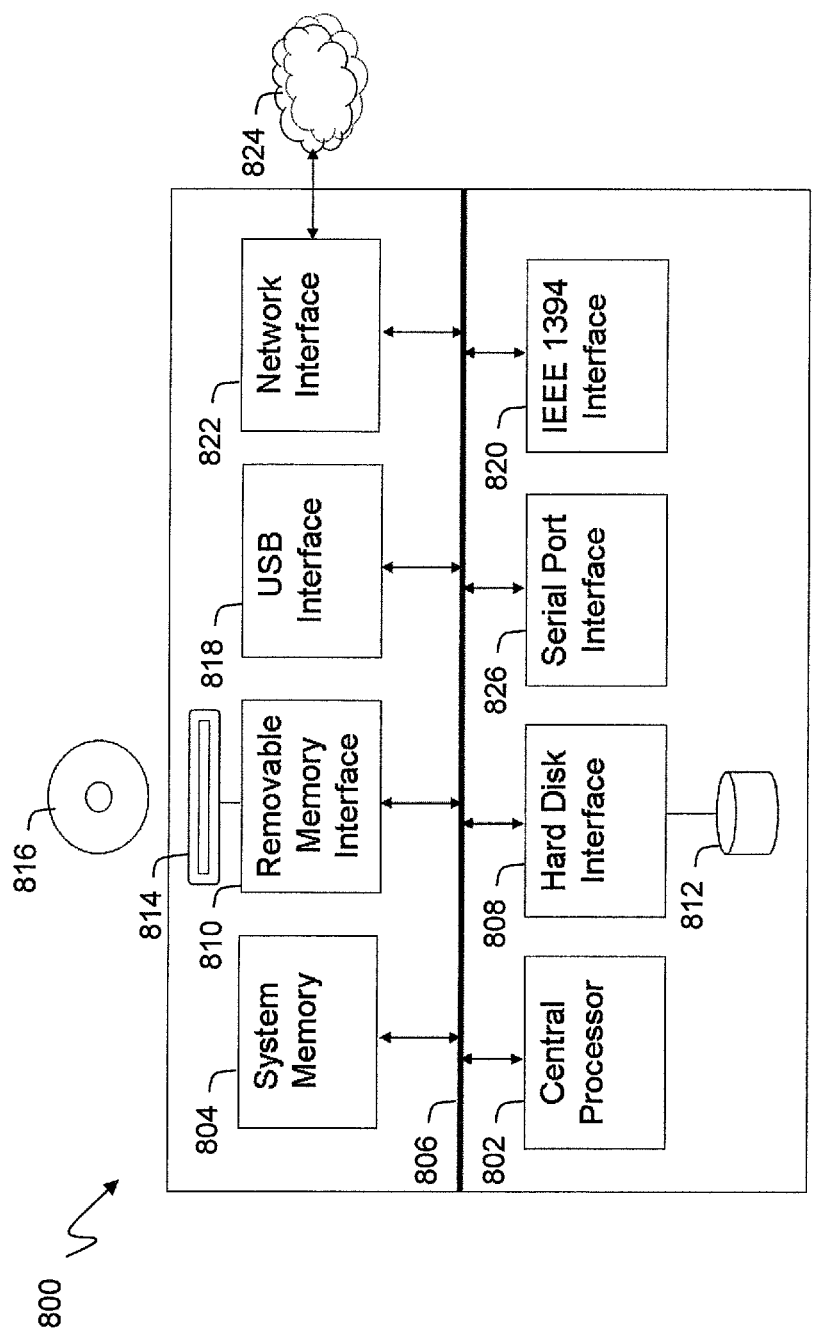
FIG. 8 illustrates a computing device, according to an embodiment of the present invention.

FIG. 8 diagrammatically illustrates a computing device 800, according to an embodiment of the present invention. The system 200 of FIG. 2 and the computing devices 615*a*, 615*b* of FIG. 6 can be identical to or similar to the computing device 800. Similarly, the method 700 of FIG. 7 can be implemented using the computing device 800.

The computing device 800 includes a central processor 802, a system memory 804 and a system bus 806 that couples various system components, including coupling the system memory 804 to the central processor 802. The system bus 806 may be any of several types of bus structures including a memory bus or memory controller, a peripheral bus, and a local bus using any of a variety of bus architectures. The structure of system memory 804 is well known to those skilled in the art and may include a basic input/output system (BIOS) stored in a read only memory (ROM) and one or more program modules such as operating systems, application programs and program data stored in random access memory (RAM).

The computing device 800 can also include a variety of interface units and drives for reading and writing data. The data can include, for example, a displacement between the camera and the display screen as discussed above.

In particular, the computing device 800 includes a hard disk interface 808 and a removable memory interface 810, respectively coupling a hard disk drive 812 and a removable memory drive 814 to the system bus 806. Examples of removable memory drives 814 include magnetic disk drives and optical disk drives. The drives and their associated computer-readable media, such as a Digital Versatile Disc (DVD) 816 provide non-volatile storage of computer readable instructions, data structures, program modules and other data for the computer system 800. A single hard disk drive 812 and a single removable memory drive 814 are shown for illustration purposes only and with the understanding that the computing device 800 can include several similar drives. Furthermore, the computing device 800 can include drives for interfacing with other types of computer readable media.

The computing device 800 may include additional interfaces for connecting devices to the system bus 806. FIG. 8 shows a universal serial bus (USB) interface 818 which may be used to couple a device to the system bus 806. For example, an IEEE 1394 interface 820 may be used to couple additional devices to the computing device 800. Examples of additional devices include cameras for receiving images or video, such as the training images of FIG. 1.

The computing device 800 can operate in a networked environment using logical connections to one or more remote computers or other devices, such as a server, a router, a network personal computer, a peer device or other common network node, a wireless telephone or wireless personal digital assistant. The computing device 800 includes a network interface 822 that couples the system bus 806 to a local area network (LAN) 824. Networking environments are commonplace in offices, enterprise-wide computer networks and home computer systems.

A wide area network (WAN), such as the Internet, can also be accessed by the computing device, for example via a modem unit connected to a serial port interface 826 or via the LAN 824.

Video conferencing can be performed using the LAN 824, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device can be operated in a client-server configuration to permit a user to retrieve data from, for example, a web-based server.

The operation of the computing device can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In summary, advantages of some embodiments of the present invention include an improved video conferencing experience, an improved video or image based communication, and simpler and less expensive video capture or conferencing systems. Additionally, the present invention can be applied to legacy video conferencing systems.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

Accordingly, this patent specification is intended to embrace all alternatives, modifications and variations of the present invention that have been discussed herein, and other embodiments that fall within the spirit and scope of the above described invention.

Accordingly, the system and method for eye alignment in video is simplified, provides an effective, safe, inexpensive and efficient structure and method which achieves all the enumerated objectives, provides for eliminating difficulties encountered with prior art video conferencing systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the system and method for eye alignment is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A system for image manipulation, including:
   a camera;
   a display screen adjacent to the camera;
   a processor coupled to the camera and the display screen; and
   a memory coupled to the processor, including instructions executable by the processor for:
   receiving a source image from the camera; and
   generating a synthetic image based upon the source image, the synthetic image corresponding to a view of a virtual camera located at the display screen, wherein the synthetic image is generated by:
   detecting a face in the source image;
   applying a 3D Active Appearance Model (AAM) to the face;
   modifying parameters of the 3D AAM; and
   rotating the 3D AAM according to a displacement between the camera and the virtual camera.

2. The system according to claim 1, wherein the camera and display screen are integrated into a single structure.

3. The system according to claim 1, wherein the camera and display are independently movable, and the memory further includes instructions for estimating a location of the display screen relative to the camera.

4. The system according to claim 1, wherein the virtual camera location is fixed centrally with respect to the display screen.

5. The system according to claim 1, wherein the virtual camera location is determined based upon content presented on the display screen.

6. The system according to claim 1, wherein the image comprises an image of a video sequence.

7. The system according to claim 6, wherein the video sequence is one of a two-dimensional or a three-dimensional video sequence.

8. The system according to claim 1, wherein the memory further includes instructions for:
   receiving a second source image from the camera; and
   generating a second synthetic image based upon the source image and the second source image, the second synthetic image corresponding to the view of the virtual camera.

9. The system according to claim 1, wherein generating the synthetic image comprises modifying metadata relating to the source image.

10. The system according to claim 9, wherein the metadata includes camera parameters.

11. A computer implemented method for video conferencing including:
    receiving, on a data interface, a source image from a camera; and
    generating, by a processor, a synthetic image based upon the source image, the synthetic image corresponding to a view of a virtual camera located at a display screen, wherein the display screen is adjacent to the camera, wherein the synthetic image is generated by:
    detecting a face in the source image;
    applying a 3D Active Appearance Model (AAM) to the face;
    modifying parameters of the 3D AAM; and
    rotating the 3D AAM according to a displacement between the camera and the virtual camera.

12. The method according to claim 11, further including estimating a location of the display screen relative to the camera.

13. The method according to claim 11, wherein transforming the face includes transferring facial expressions from the face to an avatar image.

14. The method according to claim 11, wherein the virtual camera location is determined, by the processor, based upon content presented on the display screen.

* * * * *